Dec. 15, 1931.

A. McNAB 1,836,381

SHOCK ABSORBER

Filed Nov. 12, 1928

Inventor
Alexander McNab

Patented Dec. 15, 1931

1,836,381

UNITED STATES PATENT OFFICE

ALEXANDER McNAB, OF BRIDGEPORT, CONNECTICUT, ASSIGNOR TO McNAB ABSORBO-LIFT, INC., OF NEW YORK, N. Y., A CORPORATION OF NEW YORK

SHOCK ABSORBER

Application filed November 12, 1928. Serial No. 318,839.

This invention relates to shock absorbers, and particularly to shock absorbers of the hydraulic or hydraulic pneumatic type.

The invention is directed primarily to providing an improved shock absorber or spring control for use in connection with the running gear of automobiles, but it is to be understood that the invention may be employed on the running gear of any other type of vehicle where its use may be found advantageous, for example on the under carriage gear of air craft. The invention may be used to advantage on the cars of street railways or tramways, particularly in cases where light cars are employed.

A primary object of this invention is to provide an improved shock absorber which will be more effective in operation than shock absorbers such as are now commonly employed.

A further primary object is to provide an improved shock absorber which will be reliable and effective in operation and which can be economically manufactured in a neat and attractive form, and which will give effective service for a long period with little or no attention.

A further primary object is to provide a shock absorber in which the movements of the running gear of vehicles, or other mechanism, can be accurately and definitely controlled separately and to varying degrees in two directions; and also to provide a shock absorber which can be quickly and easily adapted for use on vehicles of widely differing weights, or in mechanisms subjected to widely differing loads, by unskilled persons.

A further object is to provide a single form of shock absorber which can be applied to all four wheels of an automobile without necessitating any change other than the use of different connecting brackets, and possibly adjustment of the metering pin and the spring for the piston valve or the changing of said parts for corresponding parts of a different size or strength.

A further object is to provide a shock absorber which will permit minor displacements of the running gear of vehicles, such as take place on paved streets, with relatively little resistance.

A further object is to provide for the expansion of oil in the shock absorber, due for example to excessive friction or hot weather, in a manner such that the controlling action of the shock absorber will not be materially affected thereby.

A still further object of the invention is to provide a shock absorber which is operatively connected in position through direct connecting members which embody resilient buffers but which eliminate the use of ball joints and pivoted levers, whereby greater simplicity is obtained, the possibility of rattling is further eliminated, and, by reason of the absence of multiplying lever connections, a shock absorber operating with relatively low pressures is obtained. The use of low pressure operation enables a more accurate and sensitive control of the spring movements of a vehicle running gear to be obtained and obviates the necessity of forming the parts of the shock absorber to within extremely fine limits of error in dimensions.

A further object of the invention is to provide a shock absorber in which the resistance to relative movement between the parts to which it is coupled is progressively increased both in accordance with the rate at which said relative movement takes place and also in accordance with the extent to which said parts are displaced in one direction from normal position.

A further particular object of the invention is to utilize both the displacement of hydraulic fluid and the varying degrees of compression of pneumatic fluid for obtaining shock absorbing results, and further to obtain these results with a minimum number of moving parts consistant with the obtaining of the other objects hereinbefore referred to and such objects or characteristics as are found in practice to be desirable.

Other objects and advantages will be apparent to those skilled in the art from the following description and accompanying drawings, which disclose a preferred embodiment of the invention, and which it is to be understood is one example of carrying the invention into effect, the invention for which protection is desired being defined by the scope and spirit of the appended claims.

In the accompanying drawings

Figures 1, 2:
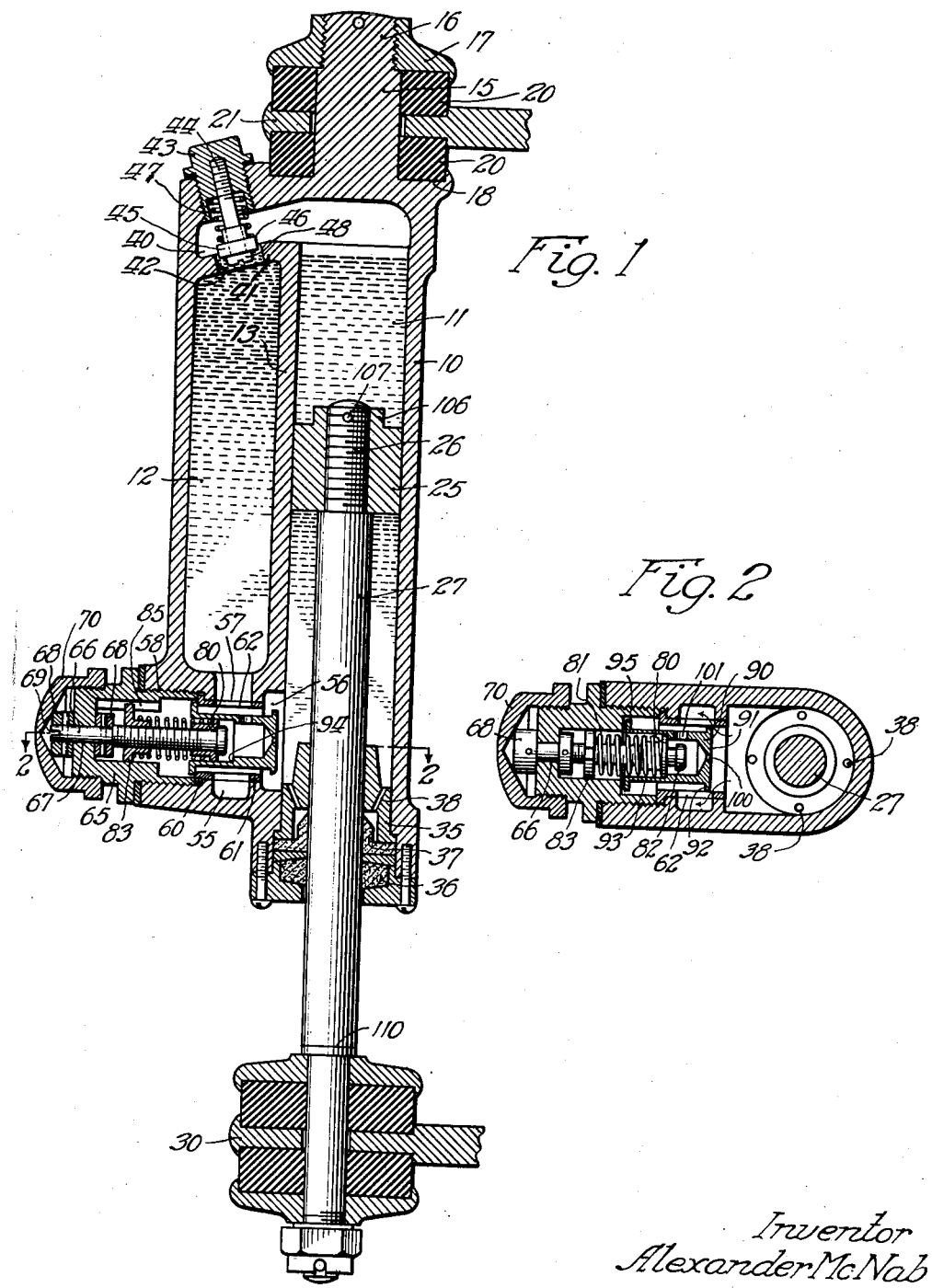
Figure 1 is a sectional elevation.
Figure 2 is a horizontal section on line 2—2 of Figure 1.

The shock absorber as illustrated comprises a container 10 which may be formed as casting, and having a main chamber which is machined to form a piston cylinder 11. The container 10 is formed with a further auxiliary chamber 12 which is separated from the cylinder 11 by a wall 13.

The upper end of the container 10 closes both the chambers 11 and 12, and is formed with a projecting boss 15 having a screw threaded portion 16 of reduced diameter which receives a flanged member 17, the flange of which is located in opposed relation to a corresponding shoulder 18 formed at the junction between the boss 15 and main portion of the container 10. Between the member 17 and the shoulder 18 are located a pair of rubber rings 20, and between these rings is located a ring-like portion 21 of a bracket which is adapted to be connected to the chassis of the vehicle.

Within the cylinder 11 there is provided a piston 25 which is rigidly mounted on a screw threaded reduced end 26 of a piston rod 27. The piston rod 27 is of substantial diameter in relation to the cylinder 11 and operates as a ram, as hereinafter described. The lower end of the cylinder 11 is open, and the piston rod 27 projects therethrough and has attached to its projecting end a ring-like portion 30 of a bracket which is adapted for connection with the running gear of the vehicle, this bracket being disposed between rubber rings which are clamped between flange members secured on the piston rod in a manner similar to the rings on the boss 15, as will be readily apparent from Figure 1.

The open lower end of the cylinder 11 is provided with a member 35 serving to guide the movement of the piston rod 27, and externally of this member the container 10 is provided with a stuffing box 36, which includes a cupped flexible element 37 which engages the piston rod 27, the member 35 being provided with apertures 38 for the purpose of subjecting the element 37 to the fluid pressure within the container.

The upper end of the cylinder 11 is placed in communication with the upper end of the auxiliary chamber 12 by means of a top passage formed by a coring 40 extending from said upper end of the cylinder in a slightly downwardly inclined direction over the auxiliary chamber 12. A wall 41 between said coring 40 and chamber 12 has a calibrated orifice 42 formed therein. In the outer wall of the container 10 opposite said orifice 42 there is formed a charging orifice which is provided with a flanged plug 43. A supporting bolt member 44 is screwed axially into the inner end of the plug 43, and slidably mounted on said bolt is a disc-like metering valve 45. The upper side of valve 45 is turned down to provide a shoulder at 46 and the inner end of the plug 43 is bored to a larger diameter to provide an annular recess 47. A coil spring disposed around the bolt 44 has its ends abutting in the recess 47 and against the shoulder 46, this coil spring serving to urge the valve 45 into the orifice 42, the normal position of the valve 45 being determined by a head 48 on the bolt which constitutes a stop. It will be seen that the valve 45 is of smaller diameter than the calibrated orifice 42, and that it serves to restrict said orifice to a definite extent.

The lower end of the chamber 12 is extended downwardly to form a pocket 55, and in the lower end of the cylinder 11 there is formed a shallow pocket 56 which communicates with the pocket 55 as hereinafter described. This communication of the lower end of the chamber 12 with the lower end of the cylinder 11 is hereinafter referred to as the bottom passage. Extending through the pocket 55 and into the pocket 56 is a horizontal bore 57 which at its outer end 58 is of enlarged diameter and screw threaded. Within the inner smaller diameter portion of the bore 57 there is fitted a tubular member 60 which has its inner end 61 located between the pockets 55 and 56, its inner end 61 constituting a restriction between said two pockets. Intermediate of its ends the member 60 is provided with openings 62 for placing its interior into communication with pocket 55.

Mounted within the enlarged end 58 of the bore 57 is a supporting member 65 having its interior end hollow. A rod 66 is mounted for rotation in a bore 67 provided in the outer end of member 65, the rod 66 being provided with keyed collars 68 on either side of the bore 67 for providing a fluid-tight joint. The outer end of the rod 66 is provided with a screw-driver slot 69, and this outer end and the collar 68 are enclosed by a hollow cap 70 which screws onto the supporting member 65.

Slidably mounted on the inner end of the rod 66 is a bearing member 80 which is normally urged by a coil spring 81 into engagement with an enlargement 82 formed on the inner extremity of the rod 66. The other end of the spring 81 abuts against a nut 83 which is mounted on an intermediate screw threaded portion of the rod 66, this nut 83 having an external flange which is notched for engaging on either side of a longitudinal key 85 formed on the hollow interior of the supporting member 65.

Mounted on the bearing member 80 for limited sliding movement thereon is a hollow cylindrical valve 90 the inner end 91 of which is provided with an external flange 92 which has an accurate sliding fit within the tubular seat member 62. The outer hollow end of the valve 90 has an internal diameter or bore 93 which terminates at its inner end in a shoulder 94, this bore 93 being in sliding engagement with the bearing member 80, with the shoulder 94 serving as a stop for limiting movement of the valve 90 relative to the bearing member 80 in one direction. The sliding of the valve 90 on the bearing member 80 in the other direction is limited by the engagement of an external flange 95 on the valve with the end of the seat member 60.

The engagement of the flange 95 with the end of the seat member 60 takes place when the flange 92 constituting the operative part of the valve member 90 is clear of the restriction 61 and within the pocket 56, as shown in Figure 1. When the shoulder 94 is in engagement with the bearing member 80 the flange 92 is seated within the restriction 61, that is the inner end of the seat member. The end 91 of the member 90 is provided with a small opening 100, and its cylindrical surface is provided with a further and larger opening 101, serving to place the interior of the valve in communication with the pocket 55 by way of the opening 62.

It will be noted that the upper end of the piston is formed of reduced diameter at 106 for the purpose of preventing the piston from covering the bore 40 in its extreme upward position, and thereby enabling the overall length of the shock absorber to be reduced. Further this reduced portion 106 provides a convenient location for the insertion of a key pin 107 to prevent the piston from becoming unscrewed relative to the piston rod 27, without danger of a slightly projecting end of said pin 107 scoring the cylinder 11.

Provided on the surface of the piston rod 27, near to the lower end thereof, is a groove 110 which by co-operation with the lower end of the packing gland cover serves to indicate a position of the piston rod 27 and piston 25 relative to the cylinder 11, this position being the position for charging the shock absorber.

To charge the shock absorber ready for installation on an automobile the piston rod 27 is forced into the cylinder until the mark 110 is flush with the bottom of the stuffing box, the plug 43 is then moved and the container is filled with hydraulic fluid, preferably oil of low cold test, until the container overflows. The brackets 21 and 30 are then mounted on the chassis and axle of the vehicle, and this operation will necessitate the piston rod being drawn downwardly until the piston 25 occupies an approximately midway position in the cylinder 11. This drawing down of the piston 25 will draw air through the charging orifice into the container. When the brackets 21 and 30 have been connected the plug 43 is replaced to retain the oil and air within the container, and thus in this manner the obtaining of a definite quantity of pneumatic fluid within the container necessary for the most effective working of the shock absorber is readily insured.

In operation, displacement of the running gear of the vehicle due to road shocks or other causes produces a movement of the piston rod 27 and piston 25 within the cylinder 11, and the metering valve 45 and the hollow piston-like valve 90 serve to control the displacement of fluid resulting from said movement.

The downward movement of the piston and piston rod is controlled by the action of valve 90. The operation of the valve 90 is as follows: Upon downward movement of the piston 25 the momentary rush of fluid through the bottom passage slides the valve outwardly on the bearing member 60 until the flange 92 is seated within the restriction 61. This allows only a comparatively small flow of fluid through the openings 100 and 101. When the downward movement of the piston 25 is only a moderately slight movement, such as would take place with a shallow impression in a road surface, the flange 92 will remain within the restriction 61. Should, however, the downward movement of the piston be excessive, such as would be caused by a deep depression in the road surface, the excess pressure formed in the lower end of the cylinder 11 will cause the valve 90 to move further in an outward direction until the flange 92 clears the restriction 61, as shown in Figure 2, this further movement of the valve 90 being rendered possible by the sliding of the bearing member 80 on the rod 66 against the action of the spring 81.

It will be appreciated that the downward movement of the piston displaces oil into the auxiliary chamber 12, and that as this chamber 12 is already full, oil will be displaced therefrom into the upper end of the cyinder 11 through the top passage. The yielding sliding mounting of the metering valve 45 enables this valve to move clear of the calibrated orifice 42 so that the flow from the chamber 12 to the upper end of the cylinder 11 is unimpeded to an extent which is substantially less than when the fluid is flowing in the opposite direction. Thus the downward movement of the piston 25 is controlled from a practical standpoint solely by the valve 90 within the bottom passage.

Upon upward movement of the piston 25 oil or air passes through the top passage into the chamber 12, and in this direction of movement the stop 48 prevents the metering valve 45 from moving, and the flow of oil through the orifice 42 is restricted. The flow of oil from the chamber 12 to the lower end of the cylinder 11 causes the valve 90 to slide inwardly until the flange 92 clears the restriction 61 and is located in the pocket 56 as shown in Figure 1 and when in this position the valve 90 offers relatively no restriction to the flow of oil through the bottom passage. Thus the upward movement of piston 25 is controlled from a practical standpoint solely by the metering valve 45.

From the foregoing it will be apparent that the controlling action of the shock absorber on the upward and downward movements of the piston 25 is separately and independently governed, and that the relative resistance to upward and downward movement can be adjusted as found desirable. In practice, I have found that advantageous results are obtained when the relative resistance to upward and downward movement is in the proportion 20 to 80.

The air trapped within the container 10 has a plurality of functions as follows. It serves to cause a yielding and gradual imposition of resistance on the movement of the piston 25 such that the action of the shock absorber takes place smoothly and without jarring. The air also serves to permit slight displacements of the piston 25, such as take place on a paved road surface, without any substantial resistance and thus easy riding qualities are obtained on comparatively smooth roads. The air also serves to allow for any expansion in the oil which may take place due to hot weather or excessive friction, and thus obviates a very hard operation of the shock absorber which would be liable to take place if the air was not present.

From the foregoing it will be appreciated that there are three distinct actions which the shock absorber has under three conditions or road surfaces. When riding on bolevards or smoothly paved roads, the slight displacements of the piston 25 are relatively unimpeded. When riding on road surfaces having only moderate irregularities, the downward movement of the piston is resisted to a comparatively great extent by reason of the flange 92 of the valve 90 remaining within the restriction 61. When riding on road surfaces having comparatively great irregularities the downward movement of the piston 25 is restricted to a comparatively lesser extent owing to the yielding of the valve 90 such that the flange 92 clears the restriction 61.

It will be appreciated that the shock absorber can readily be adapted for use on vehicles of widely varying weights, as, in the case of the top passage control metering valves of varying dimensions can be fitted for vehicles of varying weights. To install the correct metering valve for a particular vehicle, it is only necessary to remove the plug 43 and the screw 44, when the valve 45 can be interchanged with one of another size. To adjust the restriction to downward movement of the piston, for vehicles of different weights, it is only necessary to remove the cap 70 and to rotate the member 66, in order to vary the effective strength of the spring 81, in order that the valve 90 will move to the further outward position such that the flange 92 clears the restriction 61 on the occurrence of the desired pressure in the lower end of the cylinder 11. If necessary, however, the member 65 may be removed and the spring 81 may be replaced by a spring of different strength.

I claim:

1. A vehicle shock absorber, comprising a container for connection with one part of the vehicle and having a piston cylinder formed therein; said container being adapted for containing hydraulic fluid and pneumatic fluid; piston means operative within said cylinder; ram means operative within said cylinder and connected to said piston means; a packing joint in said container having the ram means extending therethrough to the exterior of said container; said exterior part of said ram means being adapted for connection with another part of the vehicle; an auxiliary chamber within said container; a top passage connecting the upper end of said cylinder with said auxiliary chamber; a bottom passage connecting the lower end of said cylinder with said auxiliary chamber; controlling means in said top passage restricting the flow of fluid therethrough; a restriction in said bottom passage; a piston-like valve mounted for relatively free sliding movement in said restriction; stop means normally for arresting the movement of said valve in a direction away from the cylinder when said valve enters said restriction; stop means for arresting the movement of said valve in the reverse direction when said valve clears said restriction to a limited extent; and means permitting a restricted flow of fluid through said bottom passage when said valve has entered said restriction.

2. A vehicle shock absorber, comprising a container for connection with one part of the vehicle and having a piston cylinder formed therein; said container being adapted for containing hydraulic fluid and pneumatic fluid; piston means operative within said cylinder; ram means operative within said cylinder and connected to said piston means; a packing joint in said container having the ram means extending therethrough to the exterior of said container; said exterior part of said ram means being adapted for connection with another part of the vehicle; an auxiliary chamber within said container; a top passage connecting the upper end of said cylinder with said auxiliary chamber; a bottom passage connecting the lower end of said cylinder with said auxiliary chamber; controlling means in said top passage restricting the flow of fluid therethrough; a restriction in said bottom passage; a piston-like valve mounted for relatively free sliding movement in said restriction; stop means normally for arresting the movement of said valve in a direction away from the cylinder when said valve enters said restriction; stop means for arresting the movement of said valve in the reverse direction when said valve clears said restriction to a limited extent, said first mentioned stop means having a yielding mounting permitting further movement of said valve in said first mentioned direction to clear same of said restriction.

3. A vehicle shock absorber, comprising a container for connection with one part of the vehicle and having a piston cylinder formed therein; said container being adapted for containing hydraulic fluid and pneumatic fluid; piston means operative within said cylinder; ram means operative within said cylinder and connected to said piston means; a packing joint in said container having the ram means extending therethrough to the exterior of said container; the exterior part of said ram means being adapted for connection with another part of the vehicle; an auxiliary chamber within said container; said cylinder and auxiliary chamber being disposed substantially vertically for having the pneumatic fluid located in the top thereof; said auxiliary chamber being positioned to one side of said cylinder; a filling orifice in said container communicating with said auxiliary chamber near the top of said chamber and at the side thereof remote from said cylinder; a top passage connecting the upper end of said cylinder with said auxiliary chamber; a bottom passage connecting the lower end of said cylinder with said auxiliary chamber; controlling means in said top passage restricting the flow of fluid therethrough; a restriction in said bottom passage; a piston-like valve mounted for relatively free sliding movement into said restriction; stop means normally for arresting movement of said valve in a direction away from the cylinder when said valve enters said restriction; a second stop means for arresting movement of said valve in the reverse direction when said valve clears said restriction to a limited extent; and means permitting a restricted flow of fluid through said bottom passage when said valve has entered said restriction, said first mentioned stop means having a yielding mounting permitting under conditions of abnormal pressure further movement of said valve in said first mentioned direction to a position clear of said restriction.

4. A vehicle shock absorber, comprising a container for connection with one part of the vehicle and having a piston cylinder formed therein; piston means operative within said cylinder; said piston means having a piston rod for connection with another part of the vehicle; an auxiliary chamber within said container; a top passage connecting the upper end of said cylinder with said auxiliary chamber; a bottom passage connecting the lower end of said cylinder with said auxiliary chamber; a restriction in said bottom passage; a piston-like valve mounted for relatively free sliding movement into said restriction; stop means normally for arresting movement of said valve in a direction away from the cylinder when said valve enters said restriction; a second stop means for arresting movement of said valve in the reverse direction when said valve clears said restriction to a limited extent; and means permitting a restricted flow of fluid through said bottom passage when said valve has entered said restriction.

5. A vehicle shock absorber, comprising a container for connection with one part of the vehicle and having a piston cylinder formed therein; piston means operative within said cylinder; said piston means having a piston rod for connection with another part of the vehicle; an auxiliary chamber within said container; a top passage connecting the upper end of said cylinder with said auxiliary chamber; a bottom passage connecting the lower end of said cylinder with said auxiliary chamber; a restriction in said bottom passage; a piston-like valve mounted for relatively free sliding movement into said restriction; stop means normally for arresting movement of said valve in a direction away from the cylinder when said valve enters said restriction; a second stop means for arresting movement of said valve in the reverse direction when said valve clears said restriction to a limited extent; and means permitting a restricted flow of fluid through said bottom passage when said valve has entered said restriction, said first mentioned stop means having a yielding mounting permitting under conditions of abnormal pressure further movement of said valve in said first mentioned direction to a position clear of said restriction.

6. A vehicle shock absorber, comprising a container for connection with one part of the vehicle and having a piston cylinder formed therein; said container being adapted for containing hydraulic fluid and pneumatic fluid; piston means operative within said cylinder; said piston means having a piston rod for connection with another part of the vehicle; an auxiliary chamber within said container; a top passage communicating the upper end of said cylinder with said auxiliary chamber and formed at least in part by a calibrated orifice; a plug mounted in a charging orifice formed in an outer wall of said container and located opposite said calibrated orifice; a metering member on said plug and projecting adjacent said calibrated orifice to partially restrict same; and a bottom passage communicating the lower end of said cylinder with said auxiliary chamber.

7. A vehicle shock absorber, comprising a container for connection with one part of the vehicle and having a piston cylinder formed therein; said container being adapted for containing hydraulic fluid and pneumatic fluid; piston means operative within said cylinder; an auxiliary chamber within said container; said cylinder and auxiliary chamber being disposed substantially vertically for having the pneumatic fluid located in the top thereof; a top passage connecting the upper end of said cylinder with said auxiliary chamber; a bottom passage connecting the lower end of said cylinder with said auxiliary chamber; a controlling means in said top passage restricting the flow of fluid therethrough in a direction outwardly from the upper end of said cylinder but permitting flow in a reverse direction with relatively little restriction; a yieldable controlling means in said bottom passage normally restricting the flow of fluid therethrough in a direction outwardly from the lower end of said cylinder but restricting to a lesser extent said flow therethrough upon the occurrence of abnormal pressure and permitting flow in a reverse direction with relatively little restriction.

8. A vehicle shock absorber, comprising a container for connection with one part of the vehicle and having a piston cylinder formed therein; said container being adapted for containing hydraulic fluid and pneumatic fluid; piston means operative within said cylinder; means for operatively associating said piston means with another part of the vehicle; controlling means permitting restricted transference of fluid in said container from one side of said piston means to the other side thereof, said controlling means including a passage having a restriction therein; a piston-like valve movable into said restriction, said valve being hollowed and mounted on a support member for free sliding movement into said restriction and out of said restriction to one side thereof; said support member being slidably mounted to permit movement of same and further movement of said valve to a position out of said restriction and on the other side thereof, and a spring engaging said support member and resisting said movement of said support member and said further movement of said valve.

9. A vehicle shock absorber, comprising a container for connection with one part of the vehicle and having a piston cylinder formed therein; said container being adapted for containing hydraulic fluid and pneumatic fluid; piston means operative within said cylinder; means for operatively associating said piston means with another part of the vehicle; controlling means permitting restricted transference of fluid in said container from one side of said piston means to the other side thereof, said controlling means including a passage having a restriction therein; a piston-like valve movable into said restriction, said valve being hollowed and mounted on a support member for free sliding movement into said restriction and out of said restriction to one side thereof; said support member being slidably mounted to permit movement of same and further movement of said valve to a position out of said restriction and on the other side thereof, and a spring engaging said support member and resisting said movement of said support member and said further movement of said valve, said support member being in the form of a sleeve slidably mounted on a rod; a housing member having a bearing through which said rod projects and in which same is mounted for rotation; a screw thread on said rod; a nut engaging said screw thread and serving as an abutment for said spring; means on the projecting end of said rod for enabling same to be rotated; and a removable cap closing said end of said rod.

10. A vehicle shock absorber, comprising a container for connection with one part of the vehicle and having a piston cylinder formed therein; said container being adapted for containing hydraulic fluid and pneumatic fluid; piston means operative within said cylinder; said piston means having a piston rod for connection with another part of the vehicle; an auxiliary chamber within said container; a top passage communicating the upper end of said cylinder with said auxiliary chamber and formed at least in part by a calibrated orifice; a plug mounted in an opening formed in an outer wall and located opposite said calibrated orifice; a metering valve movably mounted on said plug; a spring normally urging said metering valve against a stop carried by said plug and positioned to cause said valve to restrict flow through said calibrated orifice in a direction outwardly from the upper end of said cylinder; said spring permitting said valve to move clear of said calibrated orifice under the influence of flow in a direction towards the upper end of said cylinder; said valve with said stop and spring associated therewith being removable as a unit with said plug through said opening; and a bottom passage communicating the lower end of said cylinder with said auxiliary chamber.

11. A vehicle shock absorber, comprising a container for connection with one part of the vehicle and having a piston cylinder formed therein; piston means operative within said cylinder; ram means operative within said cylinder and connected to said piston means; said ram means being of substantial cross-sectional area in relation to the cross-sectional area of said cylinder; said container being only partially filled with hydraulic fluid for leaving therein a volume of pneumatic fluid at least equal to the effective volume of said ram means; a packing joint at the lower end of said cylinder having the ram means extending therethrough to the exterior of said container; said exterior part of said ram means being adapted for connection with another part of the vehicle; and transferring means for controlling a transference of hydraulic fluid in said container from one side of said piston means to the other side thereof, said transferring means permitting more ready transference of said hydraulic fluid in one direction than in the opposite direction.

12. A vehicle shock absorber, comprising a container for connection with one part of the vehicle and having a piston cylinder formed therein; said container being adapted for containing working fluid; piston means operative within said cylinder; a piston rod connected to said piston and extending through the bottom of said cylinder for operative association with another part of the vehicle; an auxiliary chamber within said container; a top passage connecting the upper end of said cylinder with said auxiliary chamber; a bottom passage connecting the lower end of said cylinder with said auxiliary chamber; controlling means in said bottom passage restricting the flow of fluid therethrough; said controlling means being located laterally of said cylinder.

13. A vehicle shock absorber, comprising a container for connection with one part of the vehicle and having a piston cylinder formed therein; said container being adapted for containing working fluid; piston means operative within said cylinder; a piston rod connected to said piston and extending through one end of said cylinder for operative association with another part of the vehicle; an auxiliary chamber within said container; a top passage connecting the upper end of said cylinder with said auxiliary chamber; a bottom passage connecting the lower end of said cylinder with said auxiliary chamber; individual controlling means in said top passage and said bottom passage, both said controlling means including control elements adapted for movement responsive to the flow of working fluid to permit a relatively restricted flow of fluid therethrough in one extreme position and to permit a relatively free flow of fluid therethrough in another extreme position.

ALEXANDER McNAB.